(12) United States Patent
Herz

(10) Patent No.: US 7,111,637 B2
(45) Date of Patent: Sep. 26, 2006

(54) ENCLOSURE SYSTEM FOR PRESSURE RELIEF DEVICE

(75) Inventor: Joshua J. Herz, Rochester, NY (US)

(73) Assignee: Qualitrol Corporation, Fairport, NY (US)

( * ) Notice: Subject to any disclaimer, the term of this patent is extended or adjusted under 35 U.S.C. 154(b) by 309 days.

(21) Appl. No.: 10/741,580

(22) Filed: Dec. 19, 2003

(65) Prior Publication Data

US 2005/0133094 A1 Jun. 23, 2005

(51) Int. Cl.
*F16K 35/00* (2006.01)

(52) U.S. Cl. .................. 137/382; 251/127; 220/726

(58) Field of Classification Search ........... 137/315.04, 137/315.33, 377, 382; 251/127; 220/726
See application file for complete search history.

(56) References Cited

U.S. PATENT DOCUMENTS

| | | | | |
|---|---|---|---|---|
| 328,840 | A | * | 10/1885 | De Witt ...................... 251/127 |
| 2,028,756 | A | * | 1/1936 | Crecca et al. ................ 137/382 |
| 3,217,082 | A | * | 11/1965 | King et al. .................. 137/469 |
| 3,914,528 | A | * | 10/1975 | Johnson ....................... 137/529 |
| 4,074,096 | A | | 2/1978 | Romanowski |
| 4,332,331 | A | * | 6/1982 | Fawley ........................ 220/726 |
| 4,676,266 | A | | 6/1987 | Johnson |
| 4,823,224 | A | | 4/1989 | Hagerman et al. |
| 4,843,187 | A | | 6/1989 | Johnson |
| 5,429,152 | A | * | 7/1995 | Van Straaten et al. ....... 137/377 |
| 5,794,915 | A | * | 8/1998 | Shimizu et al. ............. 251/127 |
| 5,913,664 | A | * | 6/1999 | Shimizu et al. ............. 251/344 |
| 5,918,619 | A | * | 7/1999 | Woods et al. .......... 137/315.04 |
| 5,937,893 | A | | 8/1999 | Herz |
| 5,957,157 | A | * | 9/1999 | Mitchell et al. ............ 137/382 |
| 6,129,116 | A | * | 10/2000 | Laskowski .................. 251/127 |
| 6,497,248 | B1 | | 12/2002 | Herz |
| 6,796,321 | B1 | * | 9/2004 | Vicars ...................... 137/512.1 |

* cited by examiner

*Primary Examiner*—John Rivell
(74) *Attorney, Agent, or Firm*—Thomas B. Ryan; Stephen B. Salai, Esq.; Harter Secrest & Emery LLP

(57) ABSTRACT

An enclosure for a pressure relief device, particularly pressure relief devices mounted on electrical equipment housings, is pre-assembled together with the pressure relief device. The enclosure, which provides for temporarily confining and directing fluids discharged from the pressure relief device, is pre-assembled leaving a clearance space so that the pressure relief device can be mounted on the housing with the enclosure system in place. A peripheral shield with an opening for attaching the enclosure to a discharge pipe or other duct work remains rotatable until deliberately secured in place. Components can be shared between the enclosure and the pressure relief device to provide a more efficient and cost effective design.

33 Claims, 2 Drawing Sheets

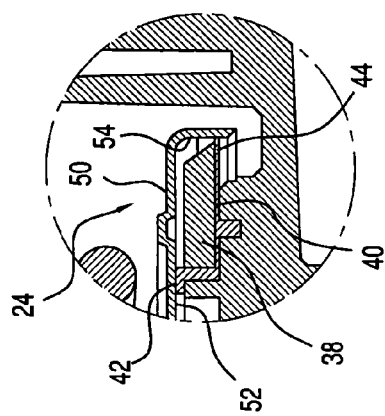
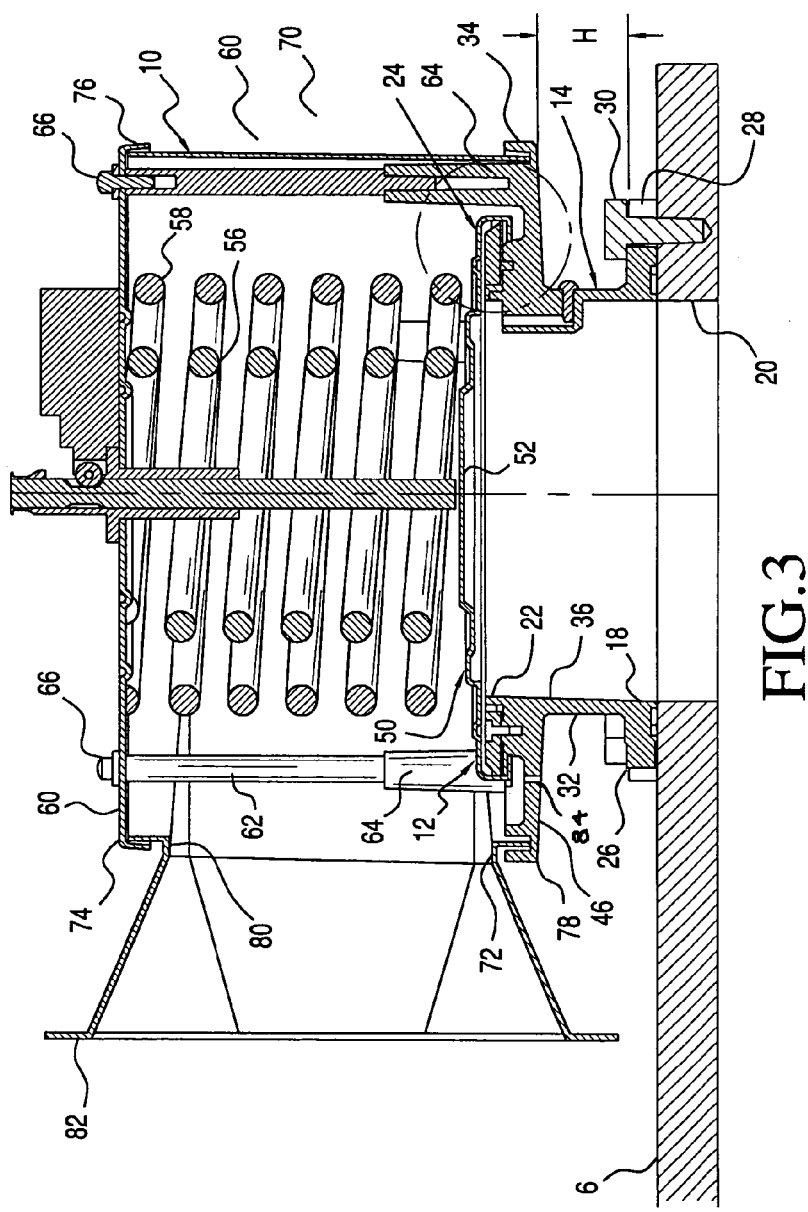

ENCLOSURE SYSTEM FOR PRESSURE RELIEF DEVICE

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "SEQUENCE LISTING"

Not applicable.

BACKGROUND OF THE INVENTION

1. Field of the Invention

The invention relates to enclosures for pressure relief devices, which are also referred to as directional shields. The enclosures temporarily confine fluids discharged through the pressure relief devices and direct the discharged fluids through a relief duct or other conduit. The invention relates particularly to such enclosures that are mounted on electrical equipment housings to control discharges of hot oil/air and protect the surrounding environment.

2. Background Art

Large pressure relief devices on medium to large power transformers (either nitrogen blanket or conservator style), load tap changers, and other electrical equipment protect the equipment from over-pressure conditions. The pressure relief devices, which are commonly referred to as PRD's, must quickly relieve increased pressure that can accumulate in the housings containing such electrical equipment by allowing large quantities of potentially very hot fluids (oil and gas) to escape from the housings in a short time. The devices must respond before the housings in which the electrical equipment is contained rupture and, in so responding, allow a sufficient amount of fluid to be discharged in a sufficiently short amount of time to prevent damage, all while, preferably, discharging fluid in a manner where it will not cause injury or damage to persons or equipment located close by.

Large quantities of hot oil and gas discharged from the pressure relief devices tend to spray out over wide areas unless confined. Such sprays are dangerous and unsafe for the environment. Accordingly, it is becoming an increasingly common practice to enclose the pressure relief devices for temporarily containing and directing the fluids to where the fluids can be more safely recovered or disposed. Generally, the enclosures fit over the top of the pressure relief devices temporarily trapping the fluid discharges between the enclosures and the electrical equipment housings. Duct work is connected to the enclosures for directing the temporarily trapped fluids beyond the pressure relief devices.

The known enclosures are assembled in place over the top of the pressure relief devices. Even in new applications, the pressure relief devices are first mounted on the electrical equipment housings and the conventional enclosures are assembled around the mounted pressure relief devices. Some disassembly of the pressure relief devices is sometimes required to attach the enclosures to the mounted pressure relief devices. Other requirements include the adaptation of indicator or alarm systems, which further complicates the assembly requirements of the enclosure. A number of examples of conventional enclosure systems for a pressure relief valves are disclosed in my co-assigned U.S. Pat. No. 5,937,893, entitled Shield for Pressure Relief Device, which patent is hereby incorporated by reference.

Although the known enclosure designs for pressure relief devices are effective for containing and directing flows of fluid discharged through the pressure relief devices, the assembly of such enclosures in place over pressure relief devices can be quite time consuming and can involve a number of steps made more difficult by other circumstances and requirements of individual electrical equipment housings. Care must be taken that the assembly is done correctly for each different application to safely accommodate the sudden discharge of large quantities of fluid.

BRIEF SUMMARY OF THE INVENTION

My invention addresses problems with prior enclosure systems for pressure relief devices, particularly problems associated with requirements for in situ assembly on electrical equipment housings. Among the improvements of my invention is the integration of enclosures with pressure relief devices so that the enclosures can be pre-assembled together with the pressure relief devices prior to mounting the devices on electrical equipment housings. The assembled enclosures preserve a clearance space for mounting the pressure relief devices on the equipment housings with the enclosures in place surrounding the discharge end of the pressure relief devices. In addition, the pressure relief devices and their pre-assembled enclosures can share components. For example, one or more components of the pressure relief device can contribute to the completion of the enclosure, and one or more components of the enclosure can contribute to the operation of the pressure relief device.

One version of my new invention, as an enclosure system for a pressure relief device for an electrical equipment housing includes a table that supports a valve assembly of the pressure relief device in a position above a flange that attaches the pressure relief device to the electrical equipment housing. The table has an extended portion that overhangs the flange. A peripheral shield mounted on the extended portion of the table forms together with the table sealing engagement for at least temporarily confining fluid discharge through the pressure relief device. The positioning of the shield on the elevated table preserves a clearance space beneath the overhung portion of the table for accessing the flange and attaching the pressure relief device to the equipment housing.

Preferably, a lid is also arranged in sealing engagement with the peripheral shield for temporarily confining the fluid discharge through the pressure relief device. The peripheral shield preferably includes upper and lower rims. The upper rim fits in sealing engagement with the lid, and the lower rim fits in sealing engagement with the extended portion of the table. The desired sealing engagement can be enhanced by a guide formed in the table for locating the peripheral shield on the table and for forming a labyrinth seal together with lower rim. Both the guide and the lower rim of the peripheral shield preferably have a circular shape that permits the peripheral shield to rotate with respect to the extended portion of the table.

Another version of my invention as an enclosure for collecting and directing fluid expelled from an electrical equipment housing through a pressure relief device also includes a table supporting a valve assembly of the pressure relief device. A compression lid is supported above the table. A spring compressed between the table and the lid biases the valve assembly. A peripheral shield captured between the table and the lid encloses the pressure relief device and has an opening for directing fluid discharged from the pressure relief device. The lid is supported by the table independently of the peripheral shield to permit the peripheral shield to be angularly adjusted with respect to the lid and the table.

The table is preferably supported on a pedestal that projects above a mounting, such as a flange, for attaching the pressure relief device to the equipment housing. The preferred table has an extended portion that is offset from the mounting to provide a clearance space that permits the pressure relief device to be attached to the housing while operatively enclosed by the peripheral shield.

Another version of my invention as a pre-assembled enclosure of a pressure relief device for discharging fluid under pressure from a pressure source includes a valve body of the pressure relief device having an entrance end and a discharge end. A mounting is formed at the entrance end of the valve body for attaching the valve body to the pressure source. A table is located at the discharge end of the valve body. A peripheral shield is mounted on the table surrounding the discharge end of the valve body for at least temporarily confining fluid discharged through the discharge end of the valve body. The peripheral shield is mounted on the table in advance of mounting the valve body to the pressure source, so that the valve body can be attached to the pressure source with a peripheral shield already in place surrounding the discharge end of the valve body.

The table, as preferred, has an extended portion overhanging the mounting at the entrance of the valve body. The peripheral shield is mounted on the extended portion of the table. The extended portion is offset above the mounting through a clearance space sufficient to access the mounting and attach the valve body to the pressure source.

Thus, even with the preferred enclosure system in place, the pressure relief device can be attached or detached to a pressure source, such as an electrical equipment housing. This permits a pre-assembly of the enclosure system around the pressure relief device prior to mounting either on an equipment housing or other pressure source. The pre-assembly of the enclosure, in turn, allows the enclosure to augment or otherwise participate in the completion of the pressure relief device and for the pressure relief device to augment or otherwise participate in the completion of the enclosure. For example, the lid of the enclosure can also function as a compression element for compressing a spring between the lid and the table for biasing the pressure relief device. Thus, the pressure relief device is dependent upon the preferred enclosure for completing the necessary elements of its own structure. Similarly, the table, and particularly the extended portion of the table, that supports the valve assembly of the pressure relief device can also be arranged to cooperate with the peripheral shield to complete the enclosure.

Another version of the invention as an enclosure system for a pressure relief device assembled together with the pressure relief device includes both an enclosure arranged for confining fluids discharged through the pressure relief device and a valve body having an extended portion in sealing engagement with a first component of the enclosure. A second component of the enclosure cooperates with the valve body for assembling the pressure relief device in an operating condition.

The second component of the enclosure preferably cooperates with the valve body for biasing the pressure relief device into a closed position. For example, the second component can be a lid arranged as a compression element that compresses a compression spring between the lid and the valve body. The first component of the enclosure is preferably a peripheral shield that is mounted on the extended portion of the valve body. The lid is also preferably supported on the extended portion of the valve body independently of the peripheral shield to permit the peripheral shield to rotate with respect to the lid for directing fluid flows from the enclosure.

The preferred valve body has an entrance end and a discharge end for conveying pressurized fluid through the valve body and includes a mounting at the entrance end of the valve body for attaching the valve body to a pressure source. The extended portion of the valve body is located at the discharge end of the valve body overhanging the mounting at the entrance of the valve body. In addition, the extended portion of the valve body is offset from the mounting at the entrance of the valve body through a clearance space so that the valve body can be attached to the pressure source with the peripheral shield in place on the extended portion of the valve body.

These and other design improvements and related costs savings are possible by using the enclosure to augment or replace structural components of the pressure relief device and by using the pressure relief device to augment or replace structural components of the enclosure. In addition, the pre-assembly of the enclosure together with the pressure relief device allows the enclosure system to be inspected at its point of manufacture and assembly prior to being distributed for use. The ability to inspect the enclosure system under controlled conditions ensures more uniform quality and greater reliability by eliminating the uncertainties associated with in situ assemblies at different locations and under different conditions.

BRIEF DESCRIPTION OF THE SEVERAL VIEWS OF THE DRAWING(S)

FIG. 3 is a cross-sectional side view of the enclosure system showing a cooperation among components between the enclosure and the pressure relief device mounted over a vent of an electrical equipment housing.

FIG. 4 is an enlarged broken-away view of a two-stage sealing system of the pressure relief device.

DETAILED DESCRIPTION OF THE INVENTION

Figure 1:
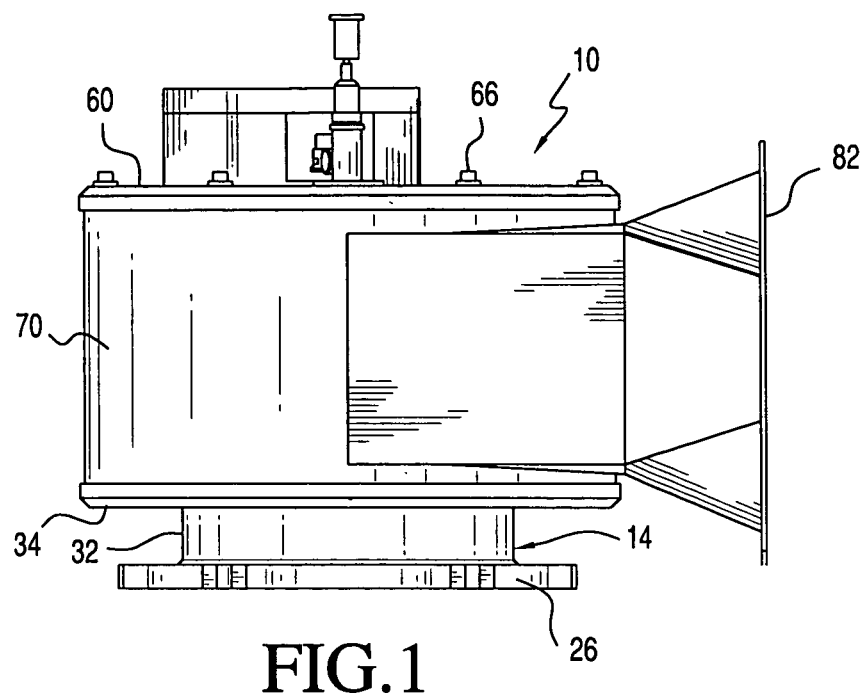
FIG. 1 is a side view of an enclosure system for a pressure relief device in accordance with my invention.
Figure 2:
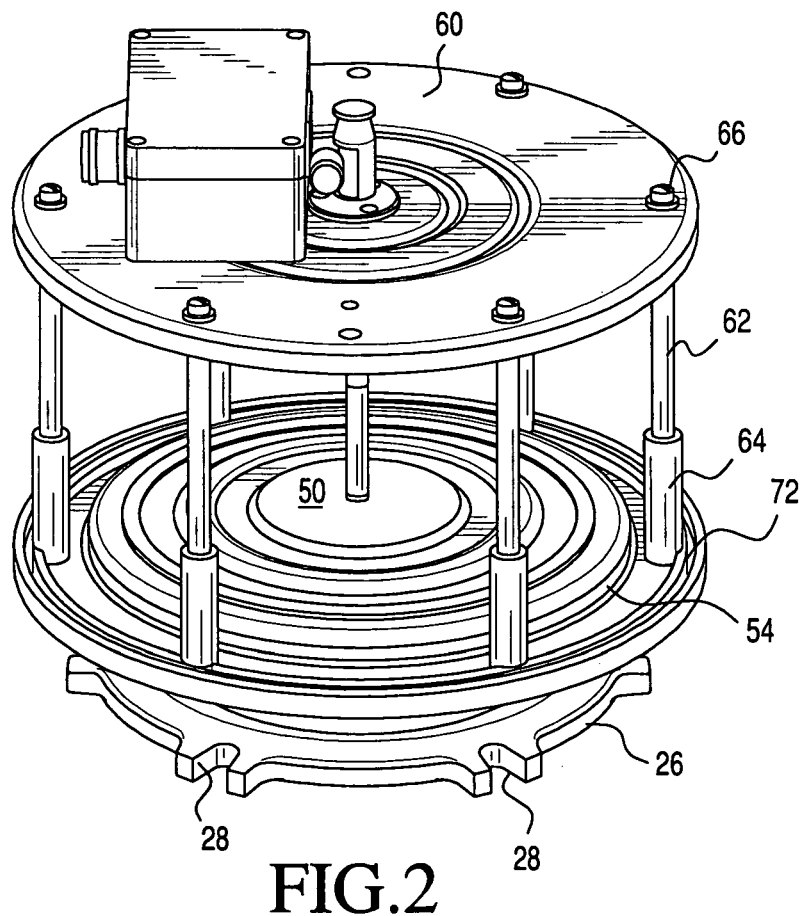
FIG. 2 is a perspective view with a peripheral shield and flange assembly removed to show supports for a lid.

A preferred example of my new enclosure system, which is particularly adaptable to pressure relief devices mountable on electrical equipment housings, is shown in drawing FIGS. 1–4. The illustrated enclosure system 10 shares structural components with a pressure relief device 12, whose fluid discharges are temporarily contained and directed by the enclosure system 10. A valve body 14 of the pressure relief device 12 supports the enclosure system 10 above an electrical equipment housing 16, whose pressures are moderated by the pressure relief device 12. The valve body 14 has an entrance end 18 adjacent to a vent opening 20 in the housing 16 and a discharge end 22 regulated by a two-stage valve assembly 24. An integral flange 26 formed at the entrance end 18 of the valve body 14 provides for attaching the valve body 14 to the housing 16.

The flange 26 includes a number of slotted openings 28 for receiving bolts 30 arranged in a conventional pattern (referred to as a bolt circle). The bolts 30 extend through the slotted openings 28 into threaded engagement with the housing 16 for securing the valve body 14 to the housing 16.

The valve body 14 also includes a pedestal 32 projecting above the flange 26 and a table 34 atop the pedestal 32 overhanging the flange 26. The pedestal 32 has a generally tubular form and shares a common throat 36 extending between the entrance end 18 of the valve body 14 within the flange 26 and the discharge end 22 of the valve body 14 within the table 34. The throat 36 has a substantially constant diameter along its length between the flange 26 and the table 34, which is preferably as large as a diameter of the vent opening 20. It is the throat 36 that provides the passage through the pressure relief device 12 for relieving excess pressure in the housing 16.

The table 34 supports the two-stage valve assembly 24 for controlling the discharges of the pressure relief device 12. As best seen in the enlarged view of FIG. 4, an annular mounting collar 38 secures first and second stage seals 42, 44 of the two-stage valve assembly 24 to the table 34. The two seals 42, 44 can be formed at opposite ends of a common seal body 40 as shown, or the two seals 42, 44 can be separately formed of the same or different materials. Preferably the two seals 42, 44 are formed of nitrile or fluorocarbon elastomers, which are compatible with a large variety of oils. Additional information about such seals and other two-stage valve assemblies that employ them, are disclosed in a co-assigned U.S. Pat. No. 6,497,248 entitled Pressure Relief Device with One Piece Gasket, which is hereby incorporated by reference.

The first stage seal 42 defines a first stage internal valve opening, and the second stage seal 44 defines a second stage external valve opening, both of which are closed by a spring biased poppet 50. A disc face 52 of the poppet 50 engages the first stage seal 42 for closing the first stage internal valve opening, and a surrounding depending skirt 54 of the poppet 50 engages second stage seal 44 for closing the second stage external valve opening. The disc face 52 of the poppet 50 positively seats against the first stage seal 42 with a compression fit that blocks flows of fluid through the throat 36. The depending skirt 54 of the poppet 50 engages the second stage seal 44 with a sliding fit. The second stage seal 44, which is shaped as a wiper blade, accommodates a small range of axial motion of the depending skirt 54 while maintaining a sealed engagement. Other details of the operation of the pressure relief device 12 are provided in my co-assigned application entitled Pressure Relief Device with Enhanced Flow Rate and filed on even date herewith, which is hereby incorporated by reference.

The enclosure system 10 is both supported by and completed by the table 34. On an extended portion 46 of the table 34 surrounding the two stage valve assembly 24, provisions are made for supporting components of the enclosure system 10. For example, mounting posts 62 support a lid 60 above the table 34. The mounting posts 62 project from bosses 64 that are evenly space around the extended portion 46 of the table 34. Although the bosses 64 are shown projecting well above the table 34, the bosses can be constructed at different sizes and shapes, such as bosses providing threaded openings substantially flush with the top of the table 34. Alternatively, the mounting posts 62 can be connected directly to the table 34 such as by forming threaded openings in the surface of the table 34.

In addition to forming a part of the enclosure system 10, the lid 60 also participates in the operation of the pressure relief device 12. The poppet 50 is biased into engagement with both seals 42 and 44 by a pair of compression springs 56 and 58 that are confined between the poppet 50 and the lid 60. Bolts 66 fasten the lid 60 to the posts 62 for compressing the compression springs 56 and 58 within a predetermined spacing between the table 34 and the lid 60. The amount of spring compression sets a threshold pressure required for lifting the poppet 50 and opening the two stage valve assembly 24. Although in the illustrated embodiment two compression springs 56, 58 are shown, a single compression spring or other biasing device can be used to set the threshold pressure required for lifting the poppet 50 depending upon the desired force profile.

Beyond the bosses 64, the extended portion 46 of the table 34 supports a peripheral shield 70. The peripheral shield 70 encloses a space between the table 34 and the lid 60. A guide in the form of an annular channel 72 formed in the table 34 locates the peripheral shield 70 in place on the table 34. An upper rim 74 of the peripheral shield 70 is captured within a collar 76 of the lid 60 in a sealing engagement that has the form of a labyrinth-type seal. A lower rim 78 of the peripheral shield 70 is received in the annular channel 72 to form a similar sealing engagement with the table 34. Although more positively contacting seals can be used to prevent any leakage of fluids from the enclosure 10, the illustrated labyrinth-style seals provide for adequately confining the large discharges of fluid expected through the pressure relief device 12.

In addition, a combination of radial clearance within the annular channel 72 and axial clearance between the lid 60 and the table 34 as set by the mounting posts 62 allows the peripheral shield 70 to rotate around the annular channel 72. Thus, while the table 34 together with the lid 60, can be arranged to constrain the peripheral shield 70 both axially and radially and to provide sealing engagements with the peripheral shield 70, the peripheral shield 70 is not mounted under any tension or compression that would prevent the peripheral shield 70 from rotating around the annular channel 72 until deliberately secured in place by a set screw or other securing mechanism. Both the lower rim 78 and the annular channel 72 have a circular form that allows the peripheral shield to slide along the channel 72.

An opening 80 surrounded by a pipe fitting 82 is provided on one side of the peripheral shield 70 for connecting the peripheral shield 70 to a discharge conduit (not shown) in the form of a pipe or additional duct work. The peripheral shield 70 is rotatable together with the fitting 82 for accommodating different angular orientations of the discharge conduit. Although the fitting 82 is depicted as a flange in the drawings of FIGS. 1 and 3, the fitting could take a variety of other forms for making the desired connection. For example, a simple sliding fit between the peripheral shield and a discharge pipe is sufficient for some applications.

The peripheral shield 70 together with the table 34 and the lid 60 collects fluid discharged under pressure from the pressure relief device 12 and directs the collected fluid to the discharge conduit where the fluid can be conveyed from the pressure relief device 12. Openings 84 in the overhung portion of the table 34 provide for draining fluid beneath the level of the discharge conduit. Further details regarding the intended operation of conventional peripheral shield assemblies are disclosed in co-assigned U.S. Pat. No. 5,937,893 entitled Shield for Pressure Relief Device, which is hereby incorporated by reference.

The table 34 supports not only the two stage valve assembly 24, but also the remaining components of the enclosure system 10 including separate supports for the peripheral shield 70 and the lid 60. The extended portion 46 of the table 34 is elevated above the flange 26 by a height "H" that defines a clearance space for mounting the enclosure assembly 10 together with the pressure relief device 12 to the housing 16. In other words, the clearance space provides access for inserting and securing the bolts 30 through the flange 26. The provision of this clearance space beneath the table 34 enables the enclosure system 10 to be pre-assembled together with the pressure relief device 12 and for both the enclosure system 10 and the pressure relief device 12 to be mounted together through the same flange 26 connection to the housing 16.

Moreover, the ability to preassemble the enclosure 10 enables components of the enclosure 10 to be functionally intertwined with components of the pressure relief device 12. For example, the lid 60, which forms a part of the enclosure system 10, also contributes to the preloading of the pressure relief device 12 for setting the threshold pressure of its operation. The posts 62 support the lid 60 at a fixed distance above the table 34 for setting the desired compression of the compression springs 56 and 58. The separate support for the lid 60 also permits the peripheral shield 70 to be rotatable with respect to the table 34 and lid 60 for orienting the output opening 80 of the peripheral shield 70 in alignment with a discharge conduit.

Although the invention is described in a context referencing components as being above or below others with respect to the vertical orientation shown in the drawings, the same relationships among components exist in other orientations as well. For example, a more generalized orientation with respect to which the same terms apply is normal to the housing on which the enclosure system is mounted.

In addition to the alternatives suggested above, various modifications can be made particularly to the enclosure structures, their supports, and the associated valving systems in keeping with the overall teaching of the invention for overcoming one or more of the limitations of the prior art.

The invention claimed is:

1. An enclosure system for a pressure relief device that regulates discharges of fluid from an electrical equipment housing comprising:
   a table that supports a valve assembly of the pressure relief device in a position above a flange that attaches the pressure relief device to the electrical equipment housing;
   the table having an extended portion that overhangs the flange;
   a peripheral shield mounted on the extended portion of the table and forming together with the table a sealing engagement for at least temporarily confining fluid discharged through the pressure relief device while preserving a clearance space beneath the overhung portion of the table for accessing the flange and attaching the pressure relief device to the equipment housing;
   a lid in sealing engagement with the peripheral shield for at least temporarily confining the fluid discharged through the pressure relief device; and
   the peripheral shield including upper and lower rims, the upper rim being in sealing engagement with the lid and the lower rim being in sealing engagement with the extended portion of the table.

2. The enclosure system of claim 1 in which the extended portion of the table includes a guide for locating the lower rim of the peripheral shield.

3. The enclosure system of claim 2 in which both the lower rim of the peripheral shield and the guide have a circular shape that permits the peripheral shield to rotate with respect to the extended portion of the table.

4. The enclosure system of claim 3 in which the guide is formed as an annular channel for receiving the lower rim of the peripheral shield and for forming a labyrinth seal together with the lower rim.

5. An enclosure system for a pressure relief device that regulates discharges of fluid from an electrical equipment housing comprising:
   a table that supports a valve assembly of the pressure relief device in a position above a flange that attaches the pressure relief device to the electrical equipment housing;
   the table having an extended portion that overhangs the flange;
   a peripheral shield mounted on the extended portion of the table and forming together with the table a sealing engagement for at least temporarily confining fluid discharged through the pressure relief device while preserving a clearance space beneath the overhung portion of the table for accessing the flange and attaching the pressure relief device to the equipment housing;
   a lid in sealing engagement with the peripheral shield for at least temporarily confining the fluid discharged through the pressure relief device; and
   a spring compressed between the table and the lid for biasing the valve assembly.

6. The enclosure system of claim 5 in which the lid is supported on the table independently of the peripheral shield to permit the peripheral shield to be angularly adjustable with respect to both the lid and the table.

7. The enclosure system of claim 6 in which the peripheral shield has an opening for directing fluid discharged from the pressure relief device.

8. An enclosure system for a pressure relief device that regulates discharges of fluid from an electrical equipment housing comprising:
   a table that supports a valve assembly of the pressure relief device in a position above a flange that attaches the pressure relief device to the electrical equipment housing;
   the table having an extended portion that overhangs the flange;
   a peripheral shield mounted on the extended portion of the table and forming together with the table a sealing engagement for at least temporarily confining fluid discharged through the pressure relief device while preserving a clearance space beneath the overhung portion of the table for accessing the flange and attaching the pressure relief device to the equipment housing;
   an opening formed through the shield for directing discharged fluid from the enclosure system; and
   at least one drain formed through the extended portion of the table for draining the temporarily confined fluid from a level below the opening in the peripheral shield.

9. The enclosure system of claim 8 in which the at least one drain has an effective diameter substantially smaller than an effective diameter of the opening in the peripheral shield to restrict a rate of flow through the drain.

10. An enclosure for collecting and directing fluid expelled from an electrical equipment housing through a pressure relief device comprising:
   a table supporting a valve assembly of the pressure relief device;
   a compression lid supported above the table;
   a spring being compressed between the table and the lid for biasing the valve assembly;

a peripheral shield captured between the table and the lid for enclosing the pressure relief device and having an opening for directing fluid discharged from the pressure relief device; and the lid being supported by the table independently of the peripheral shield to permit the peripheral shield to be angularly adjusted with respect to the lid and the table.

11. The enclosure of claim 10 in which the table is supported on a pedestal that projects above a flange for attaching the pressure relief device to the housing.

12. The enclosure of claim 11 in which the table includes an extended portion that overhangs the flange.

13. The enclosure of claim 12 in which the extended portion of the table is spaced apart from the flange through a clearance space that permits the pressure relief device to be attached to the housing while enclosed within the peripheral shield.

14. The enclosure of claim 10 in which the peripheral shield includes upper and lower rims, the upper rim being in sealing engagement with the lid and the lower rim being in sealing engagement with the table.

15. The enclosure of claim 14 in which the table includes a guide for locating the lower rim of the peripheral shield.

16. The enclosure of claim 15 in which both the lower rim of the peripheral shield and the guide have a circular shape that permits the peripheral shield to rotate with respect to the table.

17. The enclosure of claim 16 in which the guide is formed as an annular channel for receiving the lower rim of the peripheral shield and for forming a labyrinth seal together with the lower rim.

18. A pre-assembled enclosure of a pressure relief device for discharging fluid under pressure from a pressure source comprising:

a valve body of the pressure relief device having an entrance end and a discharge end;

a mounting at the entrance end of the valve body for attaching the valve body to the pressure source;

a table located at the discharge end of the valve body;

a peripheral shield mounted on the table surrounding the discharge end of the valve body for at least temporarily confining fluid discharged through the discharge end of the valve body;

the peripheral shield being mountable on the table in advance of mounting the valve body to the pressure source so that the valve body can be attached to the pressure source with the peripheral shield in place surrounding the discharge end of the valve body; and the table including a guide that locates the peripheral shield and that forms a labyrinth seal with the peripheral shield.

19. The enclosure of claim 18 in which the peripheral shield has an opening for directing fluid discharged through the discharge end of the valve body, and both the guide and the peripheral shield having a circular shape that permits the peripheral shield to rotate with respect to the table for angularly orienting the opening in the peripheral shield.

20. The enclosure of claim 19 in which the guide is formed as an annular channel for receiving the peripheral shield.

21. The enclosure of claim 20 further comprising at least one drain formed through the table for draining fluid confined within the peripheral shield.

22. A pre-assembled enclosure of a pressure relief device for discharging fluid under pressure from a pressure source comprising:

a valve body of the pressure relief device having an entrance end and a discharge end;

a mounting at the entrance end of the valve body for attaching the valve body to the pressure source;

a table located at the discharge end of the valve body;

a peripheral shield mounted on the table surrounding the discharge end of the valve body for at least temporarily confining fluid discharged through the discharge end of the valve body;

the peripheral shield being mountable on the table in advance of mounting the valve body to the pressure source so that the valve body can be attached to the pressure source with the peripheral shield in place surrounding the discharge end of the valve body;

a lid in sealing engagement with the peripheral shield for temporarily confining fluid discharged through the discharge end of the valve body; and the lid being supported above the table independently of the peripheral shield.

23. The enclosure of claim 22 in which the peripheral shield includes an opening and the peripheral shield is rotatable with respect to the lid for angularly orienting the opening in the peripheral shield.

24. A pre-assembled enclosure of a pressure relief device for discharging fluid under pressure from a pressure source comprising:

a valve body of the pressure relief device having an entrance end and a discharge end;

a mounting at the entrance end of the valve body for attaching the valve body to the pressure source;

a table located at the discharge end of the valve body;

a peripheral shield mounted on the table surrounding the discharge end of the valve body for at least temporarily confining fluid discharged through the discharge end of the valve body;

the peripheral shield being mountable on the table in advance of mounting the valve body to the pressure source so that the valve body can be attached to the pressure source with the peripheral shield in place surrounding the discharge end of the valve body;

a lid associated with the peripheral shield for temporarily confining fluid discharged through the discharge end of the valve body; and a spring compressed between the table and the lid for biasing the pressure relief device.

25. The enclosure of claim 24 further comprising posts that extend between the table and the lid for supporting the lid above the table independently of the peripheral shield.

26. An enclosure system for a pressure relief device assembled together with the pressure relief device, comprising:

an enclosure being arranged for confining fluids discharged through the pressure relief device;

a valve body including an extended portion in sealing engagement with a first component of the enclosure; and the enclosure including a second component that cooperates with the valve body for assembling the pressure relief device in an operating condition; and the second component of the enclosure cooperating with the valve body for biasing the pressure relief device into a closed position.

27. The enclosure system of claim 26 in which the second component is a lid that compresses a compression spring between the lid and the valve body.

28. The enclosure system of claim 27 in which the first component of the enclosure is a peripheral shield that is mounted on the extended portion of the valve body.

29. The enclosure system of claim 28 in which the lid is supported on the extended portion of the valve body independently of the peripheral shield to permit the peripheral shield to rotate with respect to the lid for directing fluid flows from the enclosure.

30. An enclosure system for a pressure relief device assembled together with the pressure relief device, comprising:
an enclosure being arranged for confining fluids discharged through the pressure relief device;
a valve body including an extended portion in sealing engagement with a first component of the enclosure; and
the enclosure including a second component that cooperates with the valve body for assembling the pressure relief device in an operating condition; and
the valve body having an entrance end and a discharge end for conveying pressurized fluid through the valve body and including a mounting at the entrance end of the valve body for attaching the valve body to a pressure source.

31. The enclosure system of claim 30 in which the extended portion of the valve body is located at discharge end of the valve body overhanging the mounting at the entrance of the valve body.

32. The enclosure system of claim 31 in which the first component is a peripheral shield mounted on the extended portion of the valve body.

33. The enclosure system of claim 32 in which the extended portion of the valve body is offset from the mounting at the entrance of the valve body through a clearance space so that the valve body can be attached to the pressure source with the peripheral shield in place on the extended portion of the valve body.

* * * * *